(No Model.) 6 Sheets—Sheet 1.
I. W. BLISS.
BOLT HEADING MACHINE.
No. 324,214. Patented Aug. 11, 1885.
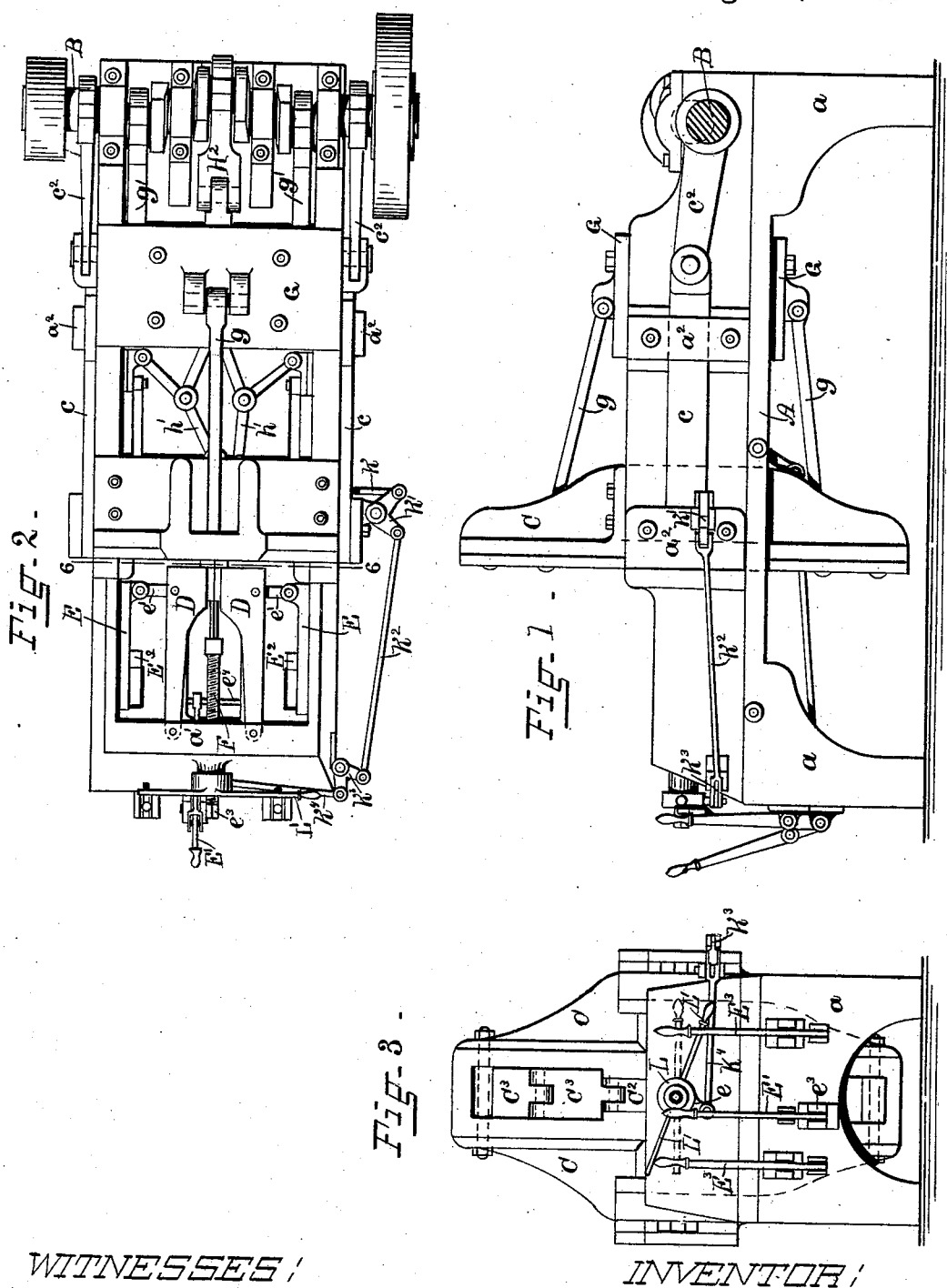
WITNESSES:
C. H. Leuther Jr.
Jno. L. Coudron
INVENTOR:
Irving W. Bliss
by Joseph A. Miller & Co
Attys.

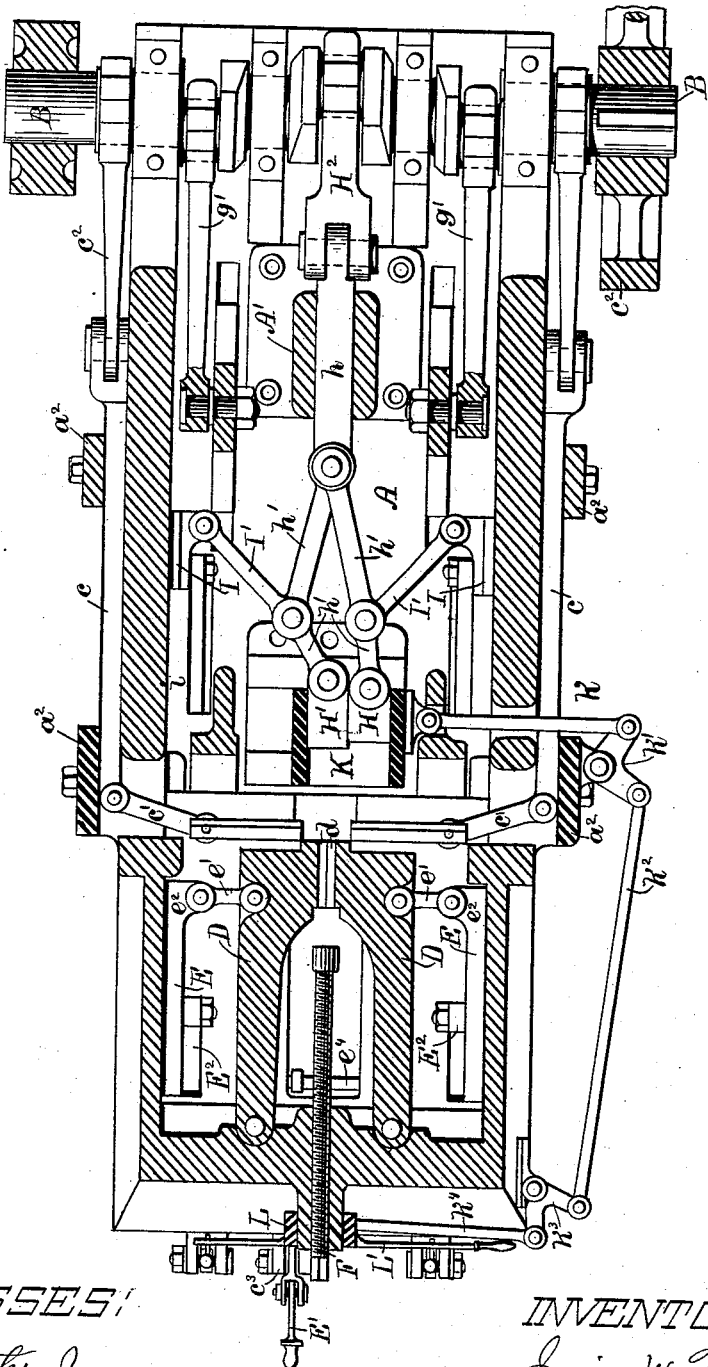

(No Model.) 6 Sheets—Sheet 3.

I. W. BLISS.
BOLT HEADING MACHINE.

No. 324,214. Patented Aug. 11, 1885.

WITNESSES:
C. H. Luther Jr.
Jno. L. Coudon

INVENTOR:
Irving W. Bliss
by Joseph A. Miller & Co.
Attys.

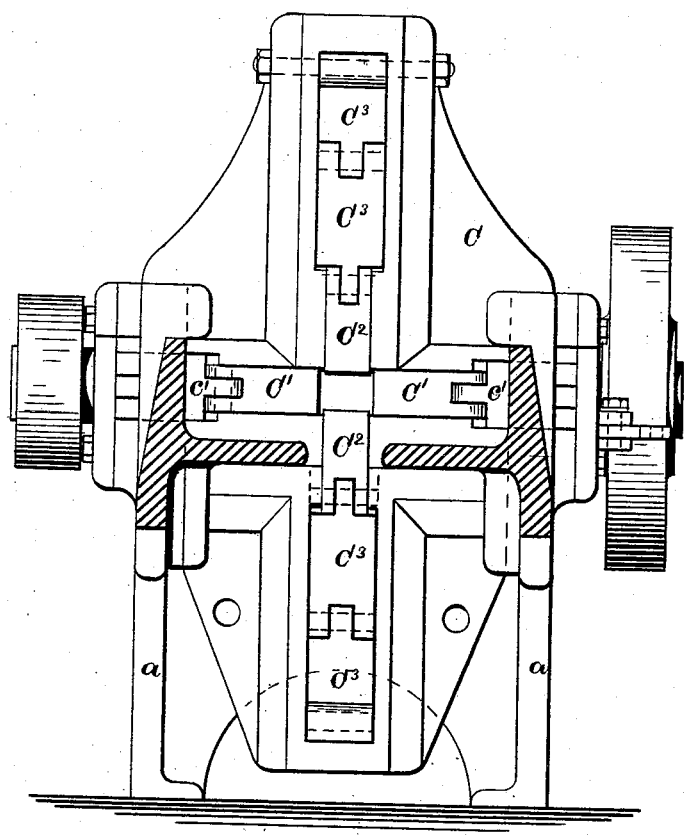

(No Model.) 6 Sheets—Sheet 5.
I. W. BLISS.
BOLT HEADING MACHINE.
No. 324,214. Patented Aug. 11, 1885.
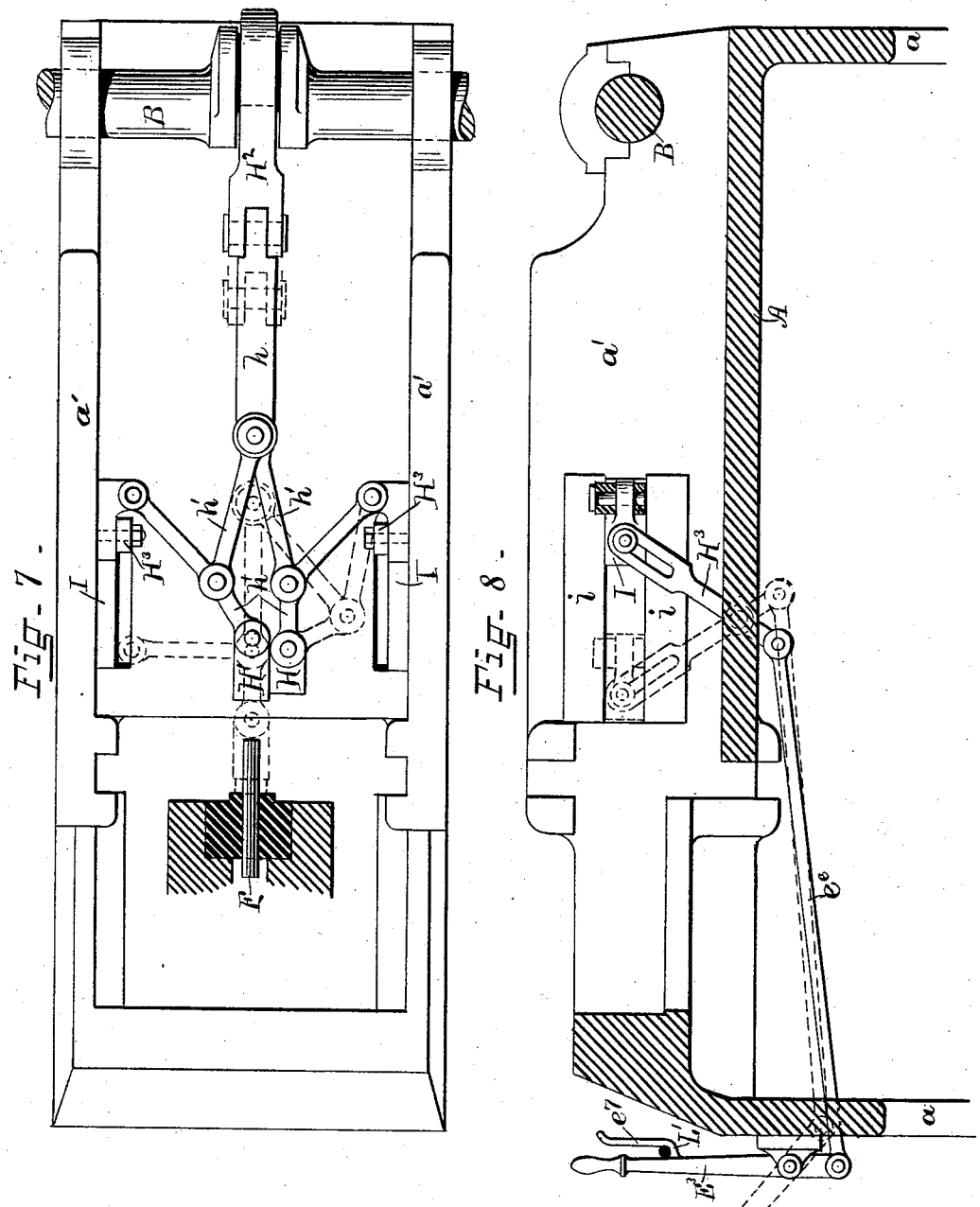
WITNESSES:
C. H. Luther Jr
Jno. L. Coudron
INVENTOR:
Irving W. Bliss
by Joseph A. Miller & Co
Att'ys.

(No Model.) 6 Sheets—Sheet 6.

I. W. BLISS.
BOLT HEADING MACHINE.

No. 324,214. Patented Aug. 11, 1885.

WITNESSES:
C. H. Luther Jr
Jno. L. Coudron

INVENTOR:
Irving W. Bliss
by Joseph A. Miller & Co
Att'ys

UNITED STATES PATENT OFFICE.

IRVING W. BLISS, OF PROVIDENCE, RHODE ISLAND.

BOLT-HEADING MACHINE.

SPECIFICATION forming part of Letters Patent No. 324,214, dated August 11, 1885.

Application filed March 3, 1884. (No model.)

*To all whom it may concern:*

Be it known that I, IRVING W. BLISS, of the city and county of Providence, State of Rhode Island, have invented certain new and useful Improvements in Bolt-Heading Machines, of which the following is a specification.

My invention relates to machines for upsetting the ends of bolt-blanks for the purpose of forming heads thereon. My invention relates more particularly to that class of bolt-heading machines which are designed for heavy work—or, in other words, for heading large bolts—but certain features of my invention are applicable to machines which may be used for light work.

The objects of my invention are to so arrange the parts of the machine as to greatly increase its simplicity, and to cause the concussive shocks produced by the heading-die to be transmitted directly and positively to the operative connections of said die, which latter are caused to offer a direct and positive resistance to such shocks.

A further object of my invention is to produce a machine which shall upset the head end of the bolt-blank without producing any fracture of the metal; also, to provide the machine with certain connections whereby the operation of the heading-die may be interrupted while the running of the machine continues; also, to provide certain connections for shifting the position of the heading-die; and, finally, to provide the machine with certain connections whereby erroneous manipulation is prevented.

To the above ends my invention consists in the peculiar and novel features of the construction of the machine, whereby the above-stated objects are attained.

In order that my invention may be fully understood, I will proceed to describe it with reference to the accompanying drawings, in which—

Figure 5:
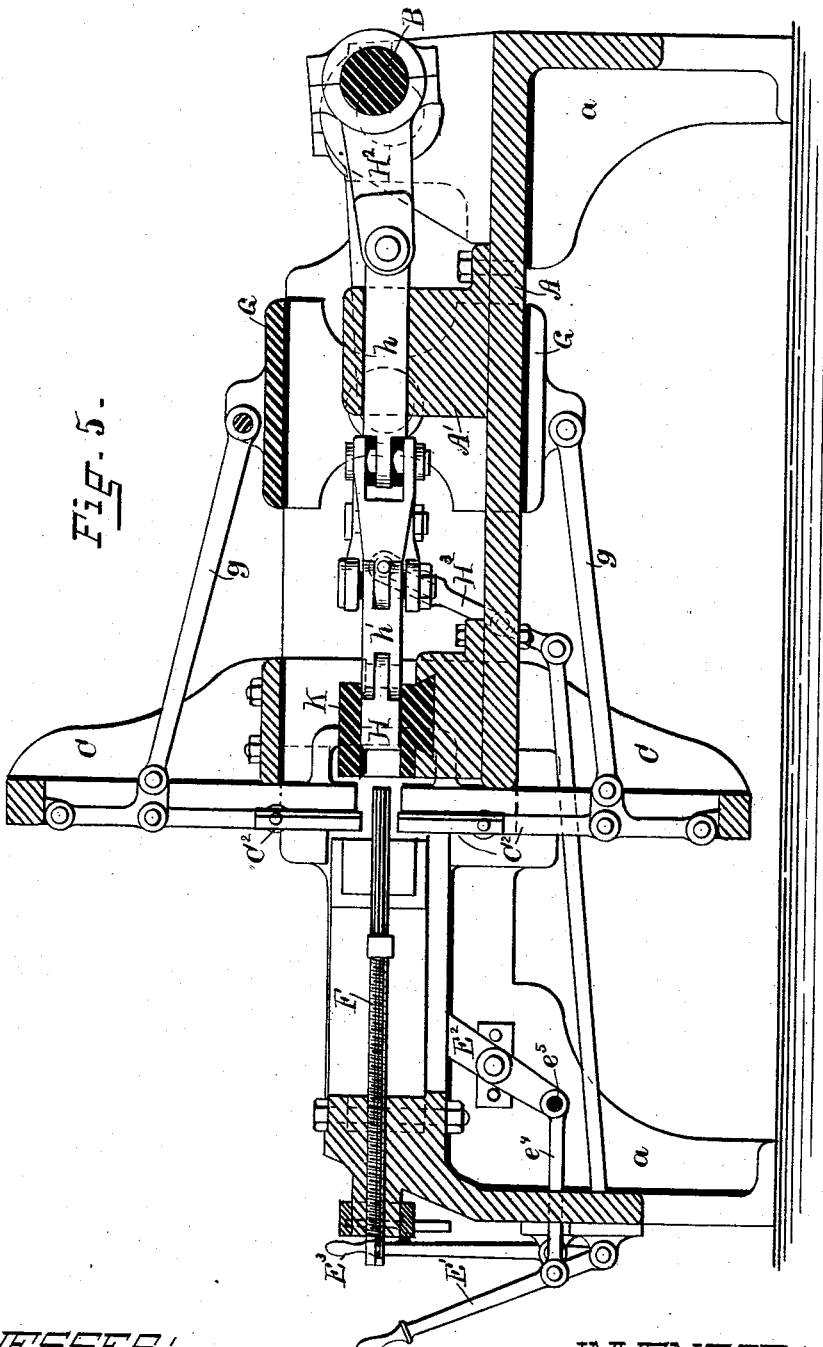
Figure 9:
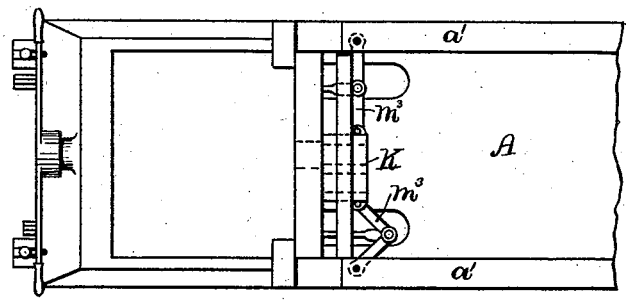
Figure 10:
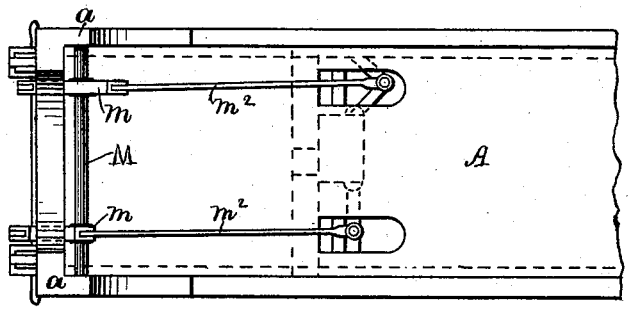
Figure 11:
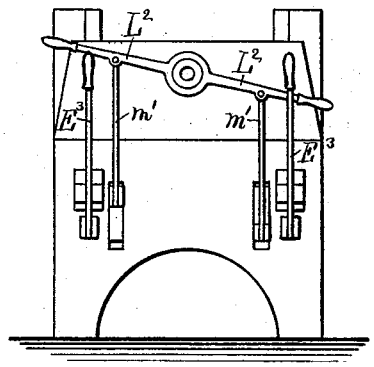
Figure 12:
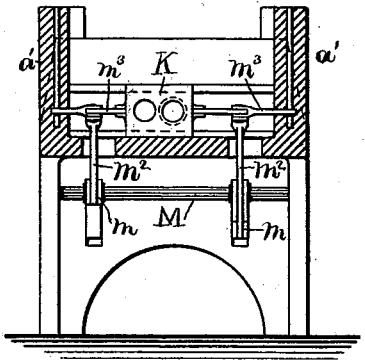

Figure 1 is a side elevation of my improved machine. Fig. 2 is a plan view of the same. Fig. 3 is a view in elevation of the same, looking toward the operative end of the machine-frame. Fig. 4 is a plan view, partly in horizontal section, of the machine. Fig. 5 is a vertical longitudinal section of the machine. Fig. 6 is a vertical cross-section of the machine on the line 6 6 of Fig. 2. Fig. 7 is a plan view of the machine, showing the connections for throwing the heading-dies into and out of operation, all the other parts of the machine being removed. Fig. 8 is a vertical longitudinal section of the machine, showing the connections for operating the blank-holding arms, all the other parts being removed. Fig. 9 is a plan view of a part of the machine, showing a modified and preferred form of connections for operating the double-die slide, all other parts being removed. Fig. 10 is an under side plan view of the same. Fig. 11 is a front end view of the same. Fig. 12 is a transverse vertical section of the same.

The machine shown in the drawings is a heavy-work machine, and I would state that in this class of work the bolt-blanks are: from the stock or metal bars before being presented to the machine.

In the said drawings, A designates the bed of the machine, which is shown as being of oblong rectangular form and supported upon the legs $a$; but the exact form or shape of the bed may be varied as circumstances may require, and the bed may be supported in any suitable or preferred manner. Around the edges of the upper side of the bed are placed the upright sections $a'$, which support certain of the working parts of the machine, as hereinafter described. At one end of the bed is mounted the driving-shaft B, which is journaled at its ends in boxes upon the contiguous portions of the opposite and longer side sections, $a'$, the said shaft extending transversely of the bed. At the opposite end of the bed is the blank-holding mechanism hereinafter described, while between the driving-shaft and the blank-holding mechanism, close to the inner ends of the latter, is the frame C for holding the forming-dies.

The blank-holding mechanism consists of two arms, D, which are each pivoted at one end to the contiguous upright end section, $a'$, and which are each provided at its opposite end with an enlargement projecting each laterally toward the other. The contiguous faces of these enlargements are each provided with a horizontal groove, $d$, preferably V-shaped, the two grooves registering with each other, so as to nearly inclose the blank when the arms D are brought together at their free ends.

E E designate two slides which are mounted horizontally upon opposite inner sides of the longer upright sections $a'$, and move each in a horizontal plane between two guides. Each of these slides is connected to the contiguous holding-arm D by a hinged link, $e'$, the outer end of which is bifurcated to embrace above and below a projection or enlargement, $e^2$, upon the inner side of each slide. The inner end of each link is inserted into a mortise in the outer side of the corresponding arm, D, and is hinged therein by a pin which passes downward through the said bar, a similar pin serving also to hinge the outer end of each link to the projection $e^2$ of the corresponding slide. These slides are actuated by a push or pull upon a lever, $E'$, which is pivoted at its lower end to a projection, $e^3$, upon the end of the machine-frame.

Secured at one end to the lower part of the lever $E'$, just above its pivot, is a rod, $e^4$, which extends forward beneath the machine to its point of connection with a transverse rod, $e^5$, which latter rests at its ends in the lower extremities of two pivoted levers, $E^2$. In order to distribute the lateral strain on the rod $e^5$, two or more auxiliary rods corresponding in function to the rod $e^4$ may extend from the cross-rod to the lever $E'$, or to a connection with said rod $e^4$ near the lever. The levers $E^2$, upon which the cross-rod $e^5$ is mounted, are each pivoted at or near their mid-length to the bed A, suitable slots being cut through the bed to receive the levers. The said levers $E^2$ are each connected pivotally at their upper ends to the corresponding slide, E, by a pin which passes through a slot extending longitudinally of the lever at its upper end and into the slide.

F designates a gage, which is externally screw-threaded and passes longitudinally of the bed-frame through an internally-threaded aperture in the end vertical section, $a'$. This gage lies between the arms D and serves to control the entrance of the bolt-blank between the holding-arms.

The vertical frame C, which carries the forming-dies, extends about equally above and below the bed-frame, and it carries four dies arranged in two pairs, one of which moves in a horizontal plane in ways on the frame and the other in a vertical plane in similar ways.

$C'$ $C'$ designate the horizontally-moving dies, and $C^2$ $C^2$ the vertically-moving dies. The dies $C'$ are each moved by a connecting rod or bar, $c$, which extends along the outer side of the bed-frame, and these bars work beneath straps $a^2$, which are secured in upright position upon the vertical side sections. The front end of each bar $c$ is connected to the corresponding holding-die, $C'$, by a link, $c'$, one end of which is hinged to the bar and the opposite end to the die. The rear ends of the bar $c$ are each connected to a crank-section of the driving-shaft B by a link, $c^2$, the forward end of which is jointed to the rear end of the bar $c$, and the rear end of which is journaled upon the corresponding crank-section.

Each vertically-moving die $C^2$ is connected to the corresponding upper or lower end of the frame C by a double link, $c^3$. The upper member of the upper pair of links and the lower member of the lower pair of links carry each upon its rear side a single projection, the end of which is embraced by the contiguous bifurcated end of the companion member, and a pivot being passed horizontally through said bifurcations and projection forms the joint of the link.

G designates a sliding frame, which extends above and below the bed-frame A, and the top and bottom of which lap over the vertical side sections, $a'$, and under the bed-frame, respectively, so as to guide the frame in its movements, the sides of the frame G extending through elongated slots in the bed-frame. From the upper and lower parts of the frame G extend two bars, $g$, which are jointed to the frame G at one end and to the projection on the rear side of the double links $c^2$.

The frame G is moved by two links, $g'$, which are each pivoted at the forward end to the sides of the frame G, and the rear ends of which are journaled to corresponding crank-sections of the shaft B. Thus it will be seen that as the driving-shaft rotates the horizontal and vertical forming-dies alternately approach to and withdraw from the center of the bolt-blank.

H H' designate the heading-dies, and $H^2$ is the pitman which imparts movement from the central crank-section of the driving-shaft to the dies. This pitman is jointed at its forward end to the link $h$, which works in a box, A', upon the rear part of the bed-frame A. Between the forward end of the link $h$ and the rear end of the dies H H' are the two-part jointed links $h'$, the sections or members of which are jointed to the link $h$ and dies H H'.

I designates the slides which work between horizontal guides $ii$, secured to the inner faces of the opposite upright side sections, $a'$.

I' I' designate links which are pivoted upon the slides I, and the opposite ends of which are pivoted to the joints of the double links $h'$.

$H^3$ $H^3$ designate levers which are each pivoted about midway of their length to the sides of the bed-frame and pass through slots formed in the bed-plate. At their upper ends the levers $H^3$ are pivoted to the slides I, while at the lower end of each is attached one end of a rod, $e^6$, which extends forward beneath the bed-frame to the lower end of a corresponding hand-lever, $E^3$. These hand-levers are each pivoted just above the point of attachment of the corresponding rod, $e^6$, to projections upon the front of the frame A. Thus it will be seen that by pulling upon the levers $E^3$ the members of the double links $h'$ are brought into alignment with the plunger and link $h$, and that in this position of the parts the movements of the pitman and its links are transmitted directly to the dies, while when the levers are pushed forward the joints in the double links are bent and the movements of the pitman and link $h$ do not affect the dies.

In the machine shown and described two dies are shown; but the arrangement for throwing the heading-dies into and out of operation may be applied to light-work machines which have but a single heading-die, there being in such case but one double link and operating-lever.

In heading large bolts it is not desirable to begin and complete the upsetting of the end of the bolt-blank with strokes of uniform power, for the reason that such operation almost invariably results in fracturing the end of the blank. To avoid this I employ two heading-dies, one of which is shorter than the other, and I also provide certain connections for shifting the dies, so that first the shorter and then the longer die shall be brought into position to operate upon the bolt-blank.

H designates the shorter die, and H' the longer die. Each of these dies is provided with a double link interposed between it and the link $h$, as before described, and each of the double links is provided with a slide and operative connections, as before. The two heading-dies work in a sliding casing, K, which moves transversely to the bed-frame, and thus brings first one and then the other heading-die into position before the bolt-blank. This casing or slide is operated by means of a rod, $k$, which extends from one side of the slide to a connection with one arm of a bell-crank, $k'$, from the other arm of which extends a rod, $k^2$, which passes alongside of the bed-frame A to one arm of a second bell-crank, $k^3$. From the other arm of this second bell-crank passes rod $k^4$, which leads to an arm, $e$, of a hub, L, which is mounted pivotally upon the center of the forward end of the bed-frame A. The hub L is turned by the radial hand-levers L'. Since, as stated, there are two slides for the heading-die double-links, there are also two operating-levers, $E^3$. Now, the levers L' serve two purposes: first, as the means whereby the slide K is moved, and, second, as the means for locking the levers $E^3$ one at a time. It will be seen that when the short die H has done its preliminary work its double link must be bent, which is accomplished by pushing the corresponding lever inward. Then the slide K is moved so as to bring the long die into position for effective work, which is done by throwing the levers L' over toward the short-die lever $E^3$, and it will be seen that in the movement of the levers L' one will be drawn out of the rest $e^7$ of one lever and the other into the rest $e^7$ of the other lever; hence there is no possibility of starting the wrong die into action. In the figures above referred to, the double links are shown as pivoted one above the other upon the link $h$ by means of a single pin; but each link may have a separate pivot, which arrangement, preferably, I think, would involve merely the lateral enlargement of the forward end of the link $h$.

In Figs. 9, 10, 11, and 12 I have shown an arrangement for operating the slide K, which I prefer as compared with that above described, inasmuch as the preferred form is located more within the bed-frame, and is more certain in its operation than the previous form. In this arrangement the levers $L^2$ are in the form of a double-ended hand-lever, centrally pivoted, and locking the levers $E^3$, as before. Depending from these levers are two rods, $m'$, which are each connected at the lower end to a bell-crank, $m$, mounted freely upon a rigid shaft, M, the ends of which rest in the legs $a$, the forward arms of the bell-cranks passing through slots in the front sides of the legs $a$, as shown. From the opposite arm of each bell-crank $m$ extends backward and upward a rod, $m^2$, the rear ends of which rods are bent upward and pass through slots in the bed-frame A and connect each with a double link, $m^3$, one end of one member of which is pivoted to the inner side of the upright section $a'$, and the corresponding end of the other member of which is similarly pivoted to the corresponding side of the slide K. Thus when the lever $L^2$ is thrown in one direction it moves the slide accurately with it, and vice versa.

I have not deemed any detailed explanation of the general operation of the machine necessary, and will only add that the bolt-blank is placed by hand between the holding-arms, and that when headed the blank drops from them out of the machine and upon the floor.

It is to be understood that I do not propose to confine myself exclusively to the precise construction and arrangement above described.

Having thus described my invention, I claim as new and desire to secure by Letters Patent—

1. The combination, with a driving-shaft, a transversely-moving slide, and a longer and a shorter header mounted in said slide, of jointed links connecting the headers with the driving-shaft, substantially as and for the purposes specified.

2. The combination, with the driving-shaft and a transversely-moving slide carrying a longer and a shorter header, of jointed links for connecting the headers with the shaft, and a lever and connections for operating the slide, as described.

3. The combination, with the header, the shaft having the cranks, and the arms connecting the header with the shaft, of the levers E', having the rests $e^7$, the pivoted levers L', arranged to lock the levers E', and the rods and bell-cranks interposed between the levers and the slide, substantially as and for the purposes described.

4. The combination, with the frames A and

C, the slide K, the crank-shaft B, and the headers H H', with their links h' and arms I', of the forming-dies, blank-holders, and levers and slides for operating the links and slide K, as specified.

5. The combination, with the bed-frame carrying the shaft B and frame C, of the heading-dies mounted in the transversely-moving slide K, the sliding frame G, and slides I, the rods, arms, links, and pitmen connecting slides I K, frame G, and the forming-dies with the shaft B, as described.

6. The combination, with the bed-frame carrying the crank-shaft B, frame C, the holding-arms, and slide K, of heading-dies with their links, the forming-dies with their links, the slides for operating said links and arms, the sliding frame G, the levers for operating the slides, the pitmen and arms for actuating the heading and forming dies, and the gage F, as set forth.

IRVING W. BLISS.

Witnesses:
J. A. MILLER, Jr.,
M. F. BLIGH.